United States Patent
Bryan et al.

(10) Patent No.: US 7,685,334 B2
(45) Date of Patent: Mar. 23, 2010

(54) METHOD FOR EFFICIENT COMMUNICATION BETWEEN A HOST LIBRARY CONTROLLER AND A MEDIUM CHANGER LIBRARY

(75) Inventors: Lourie A. Bryan, Tucson, AZ (US); James A. Fisher, Tucson, AZ (US); Raymond A. James, Lakeside, AZ (US); Kerri R. Shotwell, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 331 days.

(21) Appl. No.: 11/287,822

(22) Filed: Nov. 28, 2005

(65) Prior Publication Data

US 2007/0162656 A1 Jul. 12, 2007

(51) Int. Cl.
G06F 3/00 (2006.01)
G06F 7/00 (2006.01)
(52) U.S. Cl. .......................... 710/38; 700/214
(58) Field of Classification Search .................. 710/38; 711/153
See application file for complete search history.

(56) References Cited

U.S. PATENT DOCUMENTS

| | | | |
|---|---|---|---|
| 5,303,034 A | 4/1994 | Carmichael et al. | |
| 5,613,154 A | 3/1997 | Burke et al. | |
| 5,864,655 A | 1/1999 | Dewey et al. | |
| 6,006,308 A | 12/1999 | Matsunami et al. | |
| 6,044,442 A * | 3/2000 | Jesionowski | 711/153 |
| 6,088,740 A * | 7/2000 | Ghaffari et al. | 710/5 |
| 6,393,483 B1 * | 5/2002 | Latif et al. | 709/226 |
| 6,463,513 B1 | 10/2002 | Bish et al. | |
| 6,687,905 B1 * | 2/2004 | Day et al. | 718/102 |
| 6,725,394 B1 * | 4/2004 | Bolt | 714/7 |
| 6,826,453 B1 | 11/2004 | Grasso et al. | |
| 6,845,431 B2 | 1/2005 | Camble et al. | |
| 2003/0053715 A1 | 3/2003 | Chamberlain | |
| 2003/0126395 A1 * | 7/2003 | Camble et al. | 711/173 |
| 2003/0149840 A1 | 8/2003 | Bolt et al. | |
| 2003/0200477 A1 * | 10/2003 | Ayres | 714/2 |
| 2004/0139240 A1 * | 7/2004 | DiCorpo et al. | 710/3 |
| 2004/0236465 A1 | 11/2004 | Butka et al. | |

* cited by examiner

Primary Examiner—Henry W. H. Tsai
Assistant Examiner—Titus Wong
(74) Attorney, Agent, or Firm—Rabindranath Dutta; Konrad Raynes & Victor LLP

(57) ABSTRACT

A host library controller employs a plurality of ports for establishing a plurality of communication paths from the host library controller to a medium changer library. The host library controller further employs a processor and a memory storing instructions for the processor to issue a command from a medium changer command set, and to select one or more of the ports for communicating the medium changer command to the medium changer library depending on a command processing status of each port.

18 Claims, 12 Drawing Sheets

| LISTED PORTS | QUEUED MC COMMANDS | QUEUED MC MOVE COMMANDS |
|---|---|---|
| P31(1) | 3 | 1 |
| P31(2) | 1 | 1 |
| P31(3) | 0 | 0 |
| P31(4) | 2 | 0 |

| LISTED PORTS | QUEUED MC COMMANDS | QUEUED MC MOVE COMMANDS |
|---|---|---|
| P31(1) | 3 | 1 |
| P31(2) | 3 | 2 |
| P31(3) | 1 | 0 |
| P31(4) | 2 | 2 |

| LISTED PORTS | QUEUED MC COMMANDS | QUEUED MC MOVE COMMANDS |
|---|---|---|
| P31(1) | 4 | 3 |
| P31(2) | 5 | 3 |
| P31(3) | 3 | 1 |
| P31(4) | 5 | 3 |

| LISTED PORTS | QUEUED MC COMMANDS | QUEUED MC MOVE COMMANDS |
|---|---|---|
| P31(1) | 6 | 5 |
| P31(2) | 3 | 3 |
| P31(3) | 4 | 3 |
| P31(4) | 4 | 4 |

| LISTED PORTS | QUEUED MC COMMANDS | QUEUED MC MOVE COMMANDS |
|---|---|---|
| P31(1) | 3 | 1 |
| P31(2) | 0 | 0 |
| P31(4) | 1 | 1 |

| LISTED PORTS | QUEUED MC COMMANDS | QUEUED MC MOVE COMMANDS |
|---|---|---|
| P31(1) | 3 | 1 |
| P31(2) | 2 | 0 |
| P31(4) | 1 | 1 |

| LISTED PORTS | QUEUED MC COMMANDS | QUEUED MC MOVE COMMANDS |
|---|---|---|
| P31(1) | 5 | 4 |
| P31(2) | 2 | 2 |
| P31(4) | 4 | 3 |

| LISTED PORTS | QUEUED MC COMMANDS | QUEUED MC MOVE COMMANDS |
| --- | --- | --- |
| P31(1) | 4 | 3 |
| P31(2) | 5 | 4 |
| P31(4) | 6 | 5 |

| LISTED PORTS | QUEUED MC COMMANDS | QUEUED MC MOVE COMMANDS |
| --- | --- | --- |
| P31(1) | 3 | 1 |
| P31(4) | 0 | 0 |

| LISTED PORTS | QUEUED MC COMMANDS | QUEUED MC MOVE COMMANDS |
| --- | --- | --- |
| P31(1) | 3 | 1 |
| P31(4) | 2 | 0 |

| LISTED PORTS | QUEUED MC COMMANDS | QUEUED MC MOVE COMMANDS |
| --- | --- | --- |
| P31(1) | 6 | 4 |
| P31(4) | 3 | 2 |

METHOD FOR EFFICIENT COMMUNICATION BETWEEN A HOST LIBRARY CONTROLLER AND A MEDIUM CHANGER LIBRARY

FIELD OF THE INVENTION

The present invention generally relates to various techniques for facilitating communication between host library controllers and medium changer libraries (i.e., any library employing a medium changer as one of its functional features). The present invention specifically relates to an efficient technique for facilitating communication between an Enterprise Library Controller and a Small Computer System Interface ("SCSI") Medium Changer Library.

BACKGROUND OF THE INVENTION

FIG. 1 illustrates a library system employing an X number of intermediate control units ("ICU") 40 (e.g., sixteen ICUs 40) with each ICU 40 being physically connected to a Y number of library devices 21 of a medium changer library 20 (e.g., sixteen library devices). A host library controller as known in the art (not shown) includes an X number of ports with each port being physically connected to an associated ICU 40 whereby the known host library controller systematically or randomly selects one of the ports for communicating an issued command from a medium changer command set to medium changer library 20 via its associated ICU 40 and library devices 21. For example, the known host library control could systematically or randomly select a port for communicatingi an issued command from a medium changer command set to medium changer library 20 via ICU 40(1) and one of the Y library devices 21(1).

In operation, the selected port communicates the issued medium changer command to its associated ICU 40. Upon receiving the recently issued medium changer command, the ICU 40 will queue the recently issued medium changer command for communication to medium changer library 20 depending on a priority status of the medium changer command. For example, medium changer non-move commands will typically have a higher priority than medium changer move commands and therefore will be provided with a higher priority status in the queue. To manage the queue, the ICU 40 employs a specific number of threads (e.g., three threads) for communicating all issued medium changer commands stored in the queue to medium changer library 20. As such, if the number of previously issued medium changer commands stored in the queue exceeds the specific number of threads, then the recently issued medium changer command will be stored in the queue depending on its priority status until one of the threads is available to send the recently issued medium changer command to medium changer library 20.

It is not desirable for a host library controller to wait an infinite amount of time after issuing a medium changer command for a response from an ICU 40 indicating a successful communication of the medium changer command to medium changer library 20. In view of the fact that a host library controller can not predict how long it may take an ICU 40 to complete a communication of an issued medium changer command to medium changer library 20 and in view of the fact that a host library controller will not know the operational status of medium changer library 20 unless a precise error has been reported, a host library controller as known in the art will more than likely prematurely time out the medium changer command that results in unnecessary execution of a error recovery procedure by the known host library controller.

SUMMARY OF THE INVENTION

The present invention provides a new and unique host library controller that improves the probability of receiving an ICU response of a successful communication of a medium changer command to a medium changer library by intelligently selecting a port for communicating a medium changer command to the medium changer library as opposed to systematically or randomly selecting a port for communicating a medium changer command to the medium changer library as practiced in the art.

One form of the present invention is a host library controller comprising a plurality of ports for establishing a plurality of communication paths from the host library controller to a medium changer library. The host library controller further comprises a processor and a memory storing instructions operable within the processor, the instructions being executed for issuing a command from a medium changer command set, and selecting at least one port of the plurality of ports for communicating the medium changer command to the medium changer library depending on a command processing status of each port.

A second form of the present invention is a system comprising a host library controller and a medium changer library. The host library controller includes a plurality of ports for establishing a plurality of communication paths from the host library controller to the medium changer library. The host library controller is operable to issue a command from a medium changer command set, and to select at least one port of the plurality of ports for communicating the medium changer command to the medium changer library depending on a command processing status of each port.

A third form of the present invention is a signal bearing medium tangibly embodying a program of machine-readable instructions executable by a processor to perform operations for utilizing a plurality of ports establishing a plurality of communication paths from a host library controller to a medium changer library. The operations comprise issuing a command from a medium changer command set, and selecting at least one port of the plurality of ports for communicating the medium changer command to the medium changer library depending on a command processing status of each port.

The aforementioned forms and additional forms as wells as objects and advantages of the present invention will become further apparent from the following detailed description of the various embodiments of the present invention read in conjunction with the accompanying drawings. The detailed description and drawings are merely illustrative of the present invention rather than limiting, the scope of the present invention being defined by the appended claims and equivalents thereof.

DETAILED DESCRIPTION OF THE PRESENT INVENTION

Figure 1:
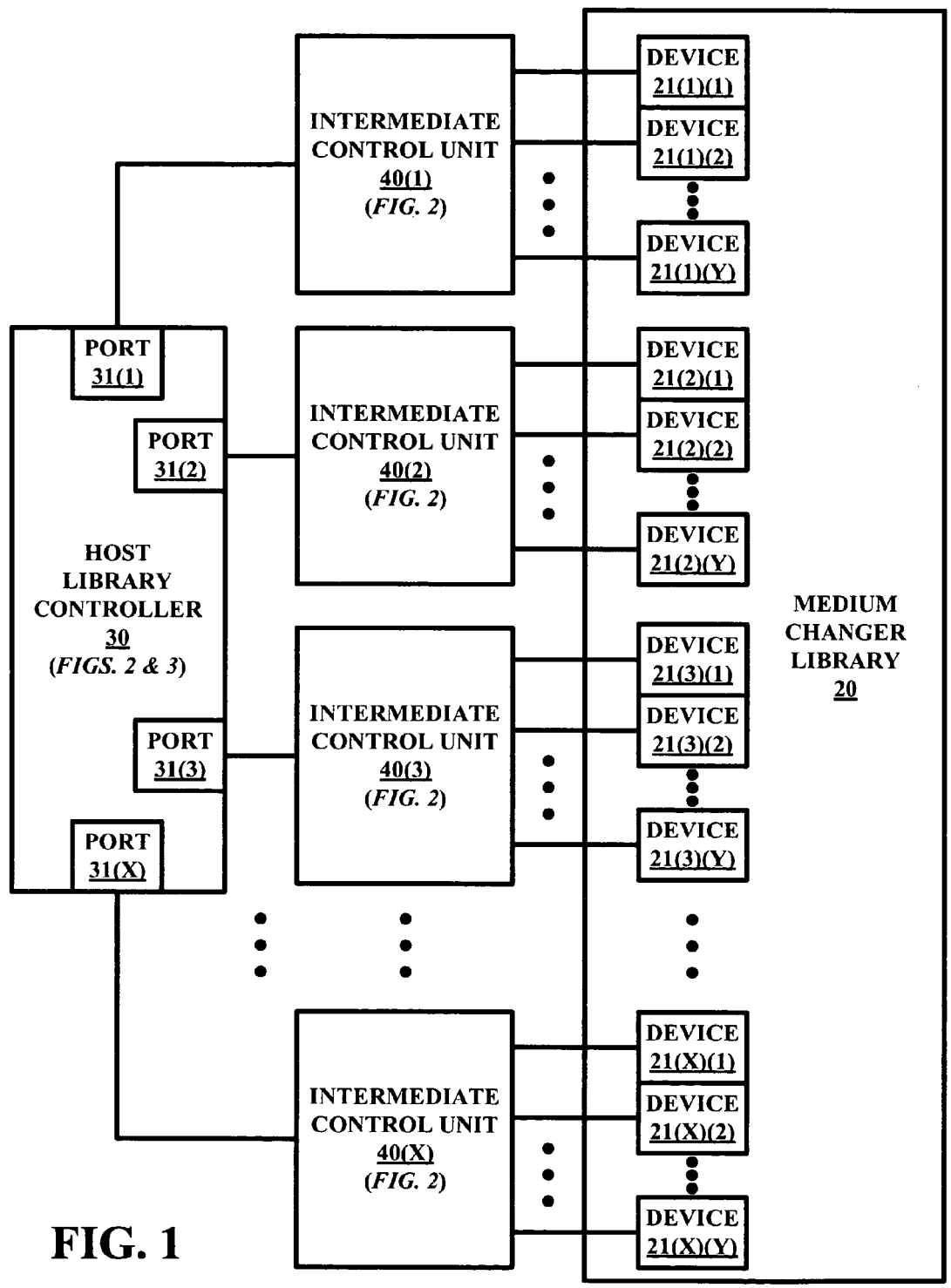
FIG. 1 illustrates one embodiment of a library system in accordance with the present invention.

FIG. 1 illustrates a host library controller 30 of the present invention having an X number of ports 31 (e.g., up to sixteen ports 31). Under the inventive principles of the present invention, host library controller 30 improves the probability of receiving an ICU response of a successful communication of a medium changer command issued by host library controller 30 to medium changer library 20 by intelligently selecting one or more of the ports 31 for communicating the issued medium changer command to medium changer library 20 via its associated ICU 40 and library devices 21.

Figure 2:
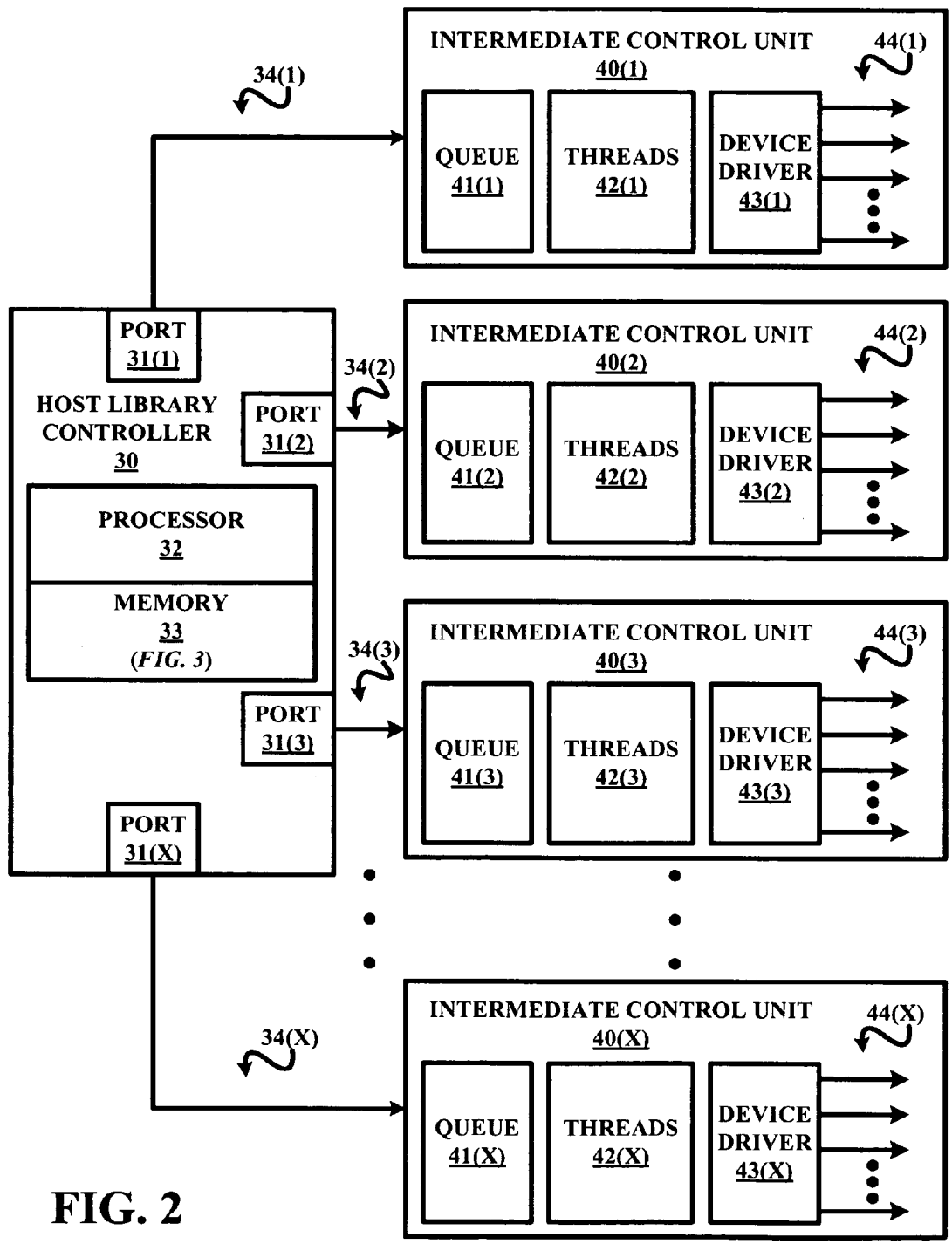
FIG. 2 illustrates one embodiment of a host library controller and intermediate control unit illustrated in FIG. 1 in accordance with the present invention.
Figure 3:
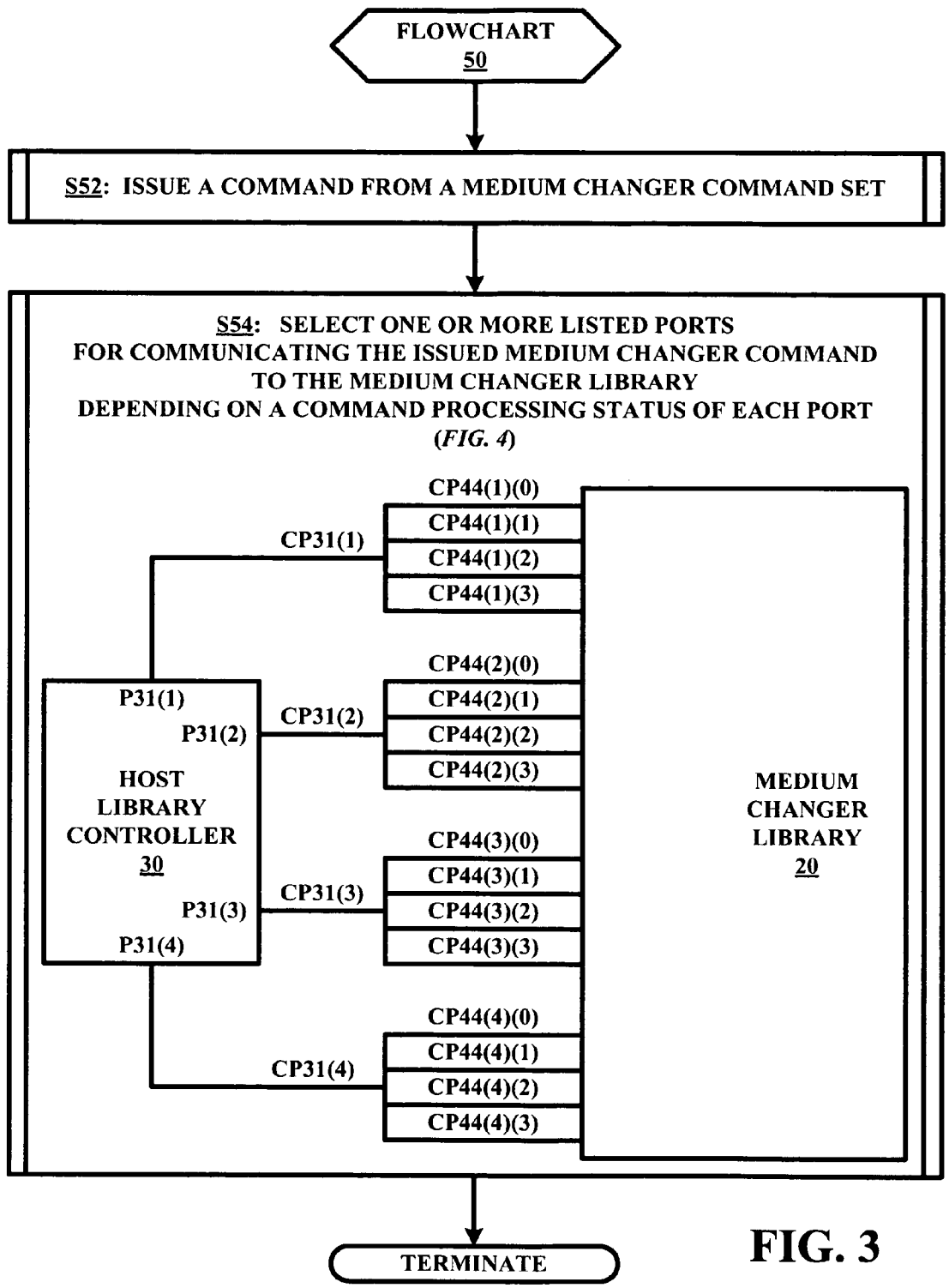
FIG. 3 illustrates a flowchart representative of one embodiment of a medium changer communication method in accordance with the present invention.

To this end, as illustrated in FIG. 2, one embodiment of host library controller 30 employs a processor 32 and a memory 33 storing instructions operable within processor 32 for implementing a medium changer command communication method of the present invention as represented by a flowchart 50 illustrated in FIG. 3. The medium changer command method of the present invention is premised on each ICU 40 employing a queue 41, a specific number of threads 42 (e.g., three threads) and a device driver 43 as shown in FIG. 2. Upon receiving a recently issued medium changer command from host library controller 30 via the communication path 34 of its corresponding port 31, an ICU 40 will store the command in queue 41 depending on its priority status for communication to medium changer library 20 by one of the threads 42 via a one of a specific number of communication paths 44 from device driver 43 to one of its associated library devices 21 (FIG. 1).

To facilitate an understanding of the medium changer command method of the present invention, flowchart 50 (FIG. 3) will now be described herein in the context of host library controller having four (4) ports 31 with each port 31 having access to four (4) communication paths 44 to medium changer library 20 via its communication path 34 to its associated ICU 40. From this description, those having ordinary skill in the art will appreciate how to use the present invention irrespective of the complexity and extensive functioning of a library system of the present invention (e.g., a host library controller having up to sixteen (16) ports).

Referring to FIG. 3, a stage S52 of flowchart 50 encompasses host library controller 30 issuing a command from a medium changer command set as would be appreciated by those having ordinary skill in the art.

A stage S54 of flowchart 50 encompasses host library controller 30 selecting one or more ports 31 for communicating the issued medium changer command to medium changer library 20 depending on a command processing status of each port 31. Specifically, port 31(1) may or may not have one or more previously issued medium changer commands stored in its associated ICU queue 41(1) (FIG. 2). Furthermore, in the case where the associated ICU queue 41(1) is storing one or more previously issued medium changer commands corresponding to port 31(1), the associated ICU threads 42(1) (FIG. 2) may or may not be in the of process of communicating a queued medium changer command via one of the four associated communication paths 44(1) to medium changer library 20. Host library controller 30 therefore ascertains the command processing status of each port 31 during stage S54 to determine the relative workload of each port 31 to thereby facilitate an intelligent selection of one or more of the ports 31 for communicating the issued medium changer command to medium changer library 20.

Figure 4:
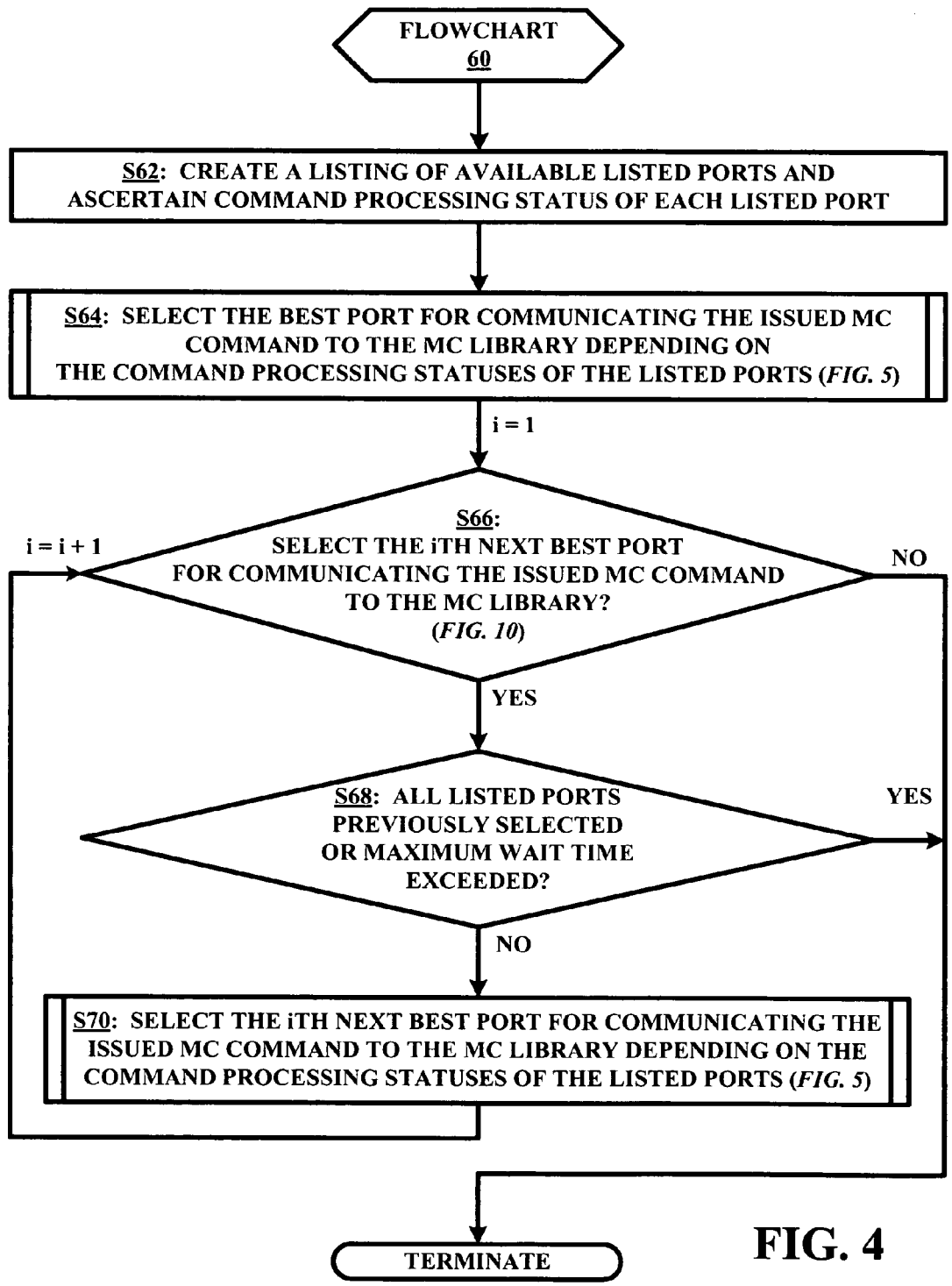
FIG. 4 illustrates a flowchart representative of one embodiment of an intelligent port selection method in accordance with the present invention.

In one embodiment of stage S54, host library controller 30 executes an intelligent port selection method of the present invention as represented by a flowchart 60 illustrated in FIG. 4. A stage S62 of flowchart 60 encompasses host library controller 30 creating a listing of available ports 31 whereby host library controller 30 ascertains a command processing status of each listed port 31. For example, assuming all ports 31(1)-31(4) (FIG. 3) are available, then host library controller 30 would create a list of ports 31(1)-31(4) and ascertain a command processing status of ports 31(1)-31(4).

A stage S64 of flowchart 60 encompasses host library controller 30 selecting a best port for communicating the issued medium changer command to medium changer library 20 depending on the command processing statuses of the listed ports 31. For example, assuming all ports 31(1)-31(4) (FIG. 3) are listed, then host library controller 30 would select a best port among listed ports 31(1)-31(4) depending on the command processing statuses of ports 31(1)-31(4).

Figure 5:
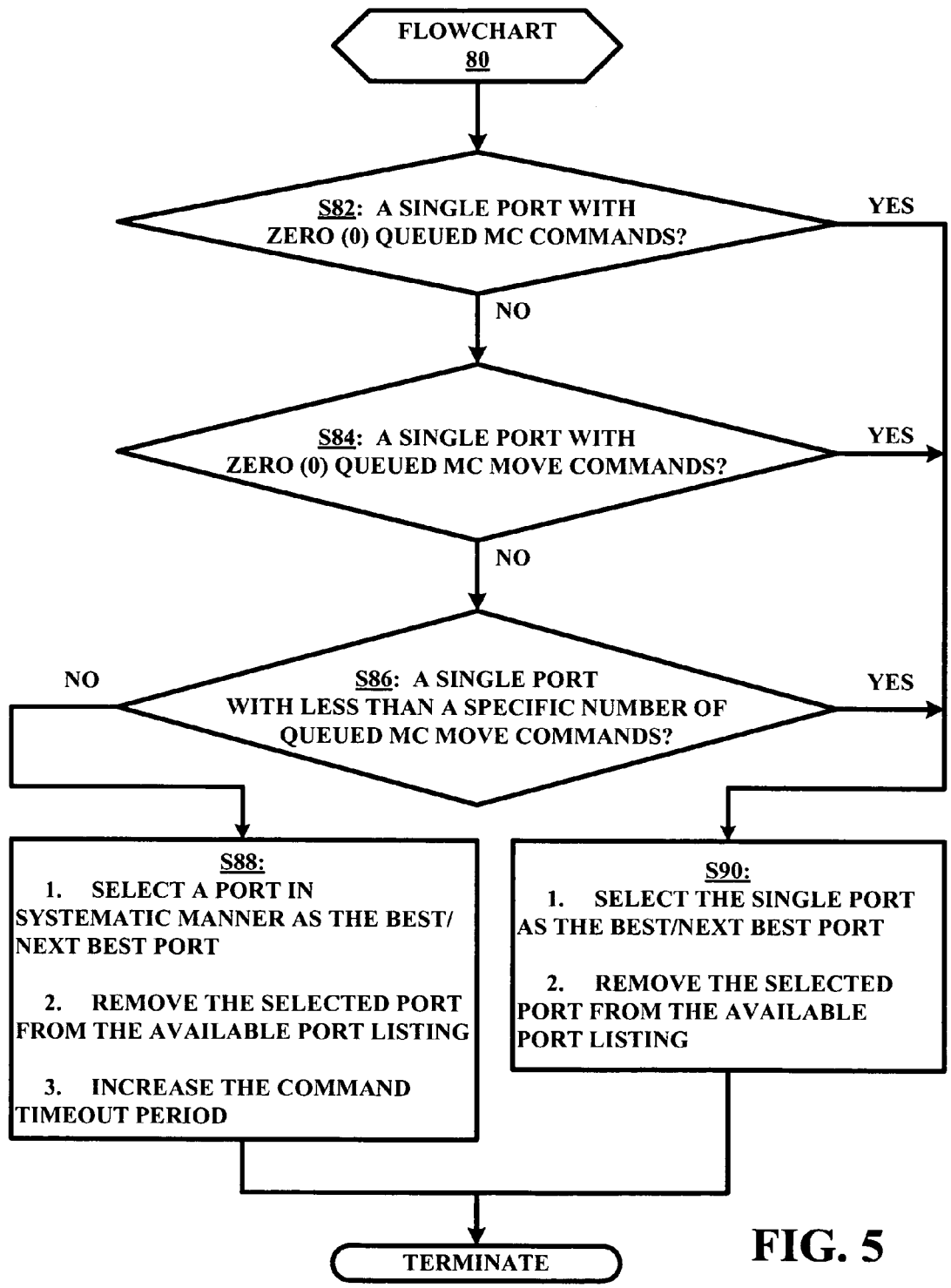
FIG. 5 illustrates a flowchart representative of one embodiment of a command processing status testing method in accordance with the present invention.
Figure 6:
FIGS. 6-9 illustrate exemplary executions of the flowcharts illustrated in FIGS. 4 and 5 in accordance with the present invention.

In one embodiment of stage S64, host library controller 30 executes a command processing status testing method of the present invention as represented by a flowchart 80 illustrated in FIG. 5. A stage S82 of flowchart 80 encompasses host library controller 30 determining from the command processing statuses of ports 31 if a single port 31 has zero (0) queued medium changer commands. If host library controller 30 determines a single port 31 has zero (0) queued medium changer commands, then host library controller 30 proceeds to a stage S90 of flowchart 80 to select that single port as the best port for communicating the issued medium changer command to medium changer library 20 and removes the selected port from the available port listing. For example, as illustrated in FIG. 6, if a listing of ports 31(1)-31(4) reveals port 31(3) is the single port among ports 31(1)-31(4) having zero (0) queued medium changer commands as indicated by the command processing statuses of ports 31(1)-31(4), then host library controller 30 would select port 31(3) as the best port and remove the selected port 31(3) from the available port listing.

Figure 7:

Otherwise, host library controller 30 proceeds to a stage S84 of flowchart 80 to determine from the command processing statuses of ports 31 if a single port 31 has zero (0) queued medium changer move commands. If host library controller 30 determines a single port 31 has zero (0) queued medium changer move commands, then host library controller 30 proceeds to stage 90 to select that single port as the best port for communicating the issued medium changer command to medium changer library 20 and removes the selected port from the available port listing. For example, as illustrated in FIG. 7, if a listing of ports 31(1)-31(4) reveals port 31(3) was the single port among ports 31(1)-31(4) having zero (0) queued medium changer move commands as indicated by the command processing statuses of ports 31(1)-31(4), then host library controller 30 would select port 31(3) as the best port and remove the selected port 31(3) from the available port listing.

Figure 8:

Otherwise, host library controller 30 proceeds to a stage S86 of flowchart 80 to determine from the command processing statuses of ports 31 if a single port 31 has less than a specific number of queued medium changer move commands (e.g., the specific number equals the number of ICU threads). If host library controller 30 determines a single port 31 has less than the specific number of queued medium changer move commands, then host library controller 30 proceeds to stage 90 to select that single port as the best port for communicating the issued medium changer command to medium changer library 20 and removes the selected port from the available port listing. For example, as illustrated in FIG. 8, if a listing of ports 31(1)-31(4) reveals port 31(3) was the single port among ports 31(1)-31(4) having less than three (3) queued medium changer move commands (in view of three (3) ICU threads) as indicated by the command processing statuses of ports 31(1)-31(4), then host library controller 30 would select port 31(3) as the best port and remove the selected port 31(3) from the available port listing.

Figure 9:

Otherwise, host library controller 30 proceeds to a stage S88 of flowchart 80 to select a port in a systematic manner as the best port for communicating the issued medium changer command to medium changer library 20 and removes the selected port from the available port listing. Furthermore, the command timeout period is increased in consideration of the fact that all of the listed ports has a significant amount of queued medium changer move commands. For example, as illustrated in FIG. 9, if a listing of ports 31(1)-31(4) reveals all of the ports 31(1)-31(4) have three (3) or more queued medium changer move commands as indicated by the command processing statuses of ports 31(1)-31(4), then host library controller 30 would select one of the ports in a systematic manner as the best port and remove the selected port from the available port listing. In this example, port 31(3) among ports 31(1)-31(4) is being pointed to by a global index and therefore would be selected by host library controller 30 as the best port for communicating the issued medium changer command to medium changer library 20.

Referring to FIGS. 5-19, those having ordinary skill in the art will appreciate the numerous advantages of the command processing status testing method of the present invention including, but not limited to, a progression of an educated decision as to the best port for communicating an issued medium changer command to medium changer library 20.

Referring again to FIG. 4, subsequent to selecting the best port during stage S64, host library controller 30 proceeds to a stage S66 to determine whether or not to select a next best port for communicating the issued medium changer command to medium changer library 20. Stage S66 is needed in view of the various problems/circumstances that may occur during an attempt by the previously selected best port to communicate the issued medium changer command to medium changer library 20 as would be appreciated by those having ordinary skill in the art.

Figure 10:
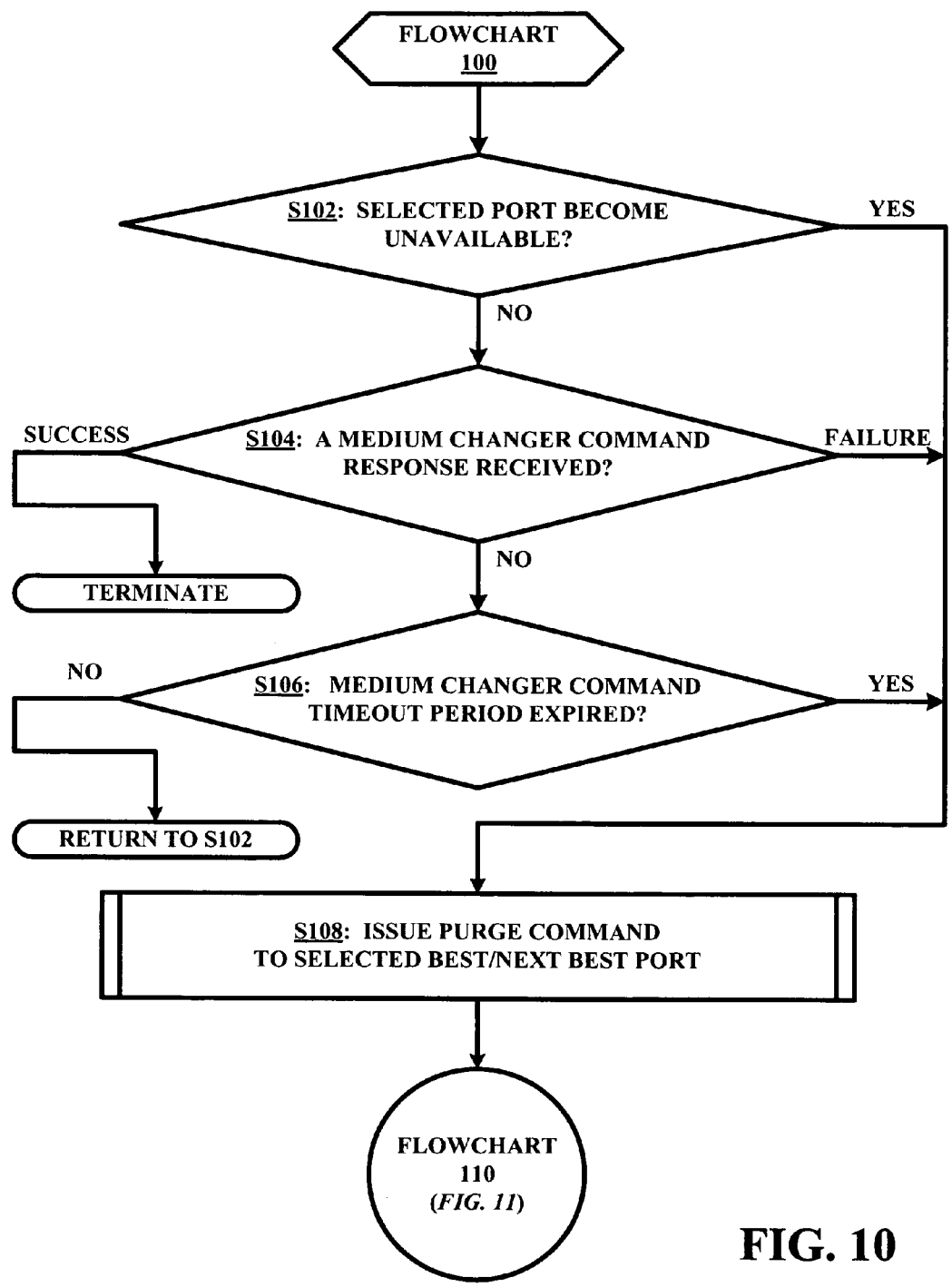
FIG. 10 illustrates a flowchart representative of one embodiment of an intelligent port retry selection method in accordance with the present invention.

In one embodiment of stage S66, host library controller 30 executes an intelligent port retry selection method of the present invention as represented by a flowchart 100 illustrated in FIG. 10 in view of terminating flowchart 100 upon a successful communication of the issued medium changer command to medium changer library 20 or in view of purging the issued medium changer command from a queue 41 associated with the selected best port 31.

Specifically, a stage S102 of flowchart 100 encompasses host library controller 30 determining whether the selected best port 31 has become unavailable as would be appreciated by those having ordinary skill in the art. In particular, the selected best port 31 may have become uninitialized subsequent to being selected as the best port but prior to a successful communication of the issued medium changer command to medium changer library 20. If the selected best port 31 has become unavailable, then host library controller 30 proceeds to a stage S108 of flowchart 100 to issue a purge command to the selected best port in an attempt to purge the issued medium changer command as stored on the associated queue 41 (FIG. 2) of the selected best port 31 to thereby facilitate a selection of a next best port for communicating the issued medium changer command to medium changer library 20.

Otherwise, host library controller 30 proceeds to a stag S104 of flowchart 100 to determine whether the selected best port 31 has received a ICU response as would be appreciated by those having ordinary skill in the art. If the selected best port 31 has received an ICU success response indicating the medium changer command was successfully communicated to medium changer library 20, then host library controller 30 proceeds to terminate flowchart 100. If the selected best port 31 has received an ICU failure response indicating the medium changer command was unsuccessfully communicated to medium changer library 20 (e.g., an ICU failure response related to the ICU associated with the best port experiencing operational problems or related to the ICU associated with the best port being unable to communicate with medium changer library 20), then host library controller 30 proceeds to stage S108 to issue a purge command to the selected best port 31 as previously described herein.

Otherwise, if the selected best port 31 has not received an ICU response, then host library controller 30 proceeds to a stag S106 of flowchart 100 to determine whether a command timeout period of the issued medium changer command has expired as would be appreciated by those having ordinary skill in the art. If so, then host library controller 30 proceeds to stage S108 to issue a purge command to the selected best port 31 as previously described herein. Otherwise, host library controller 30 returns to stage S102 whereby stages S102-S106 are repeated until host library controller 30 is either triggered to terminate flowchart 100 upon a receiving an ICU success response or triggered to proceed to purge stage S108.

Figure 11:
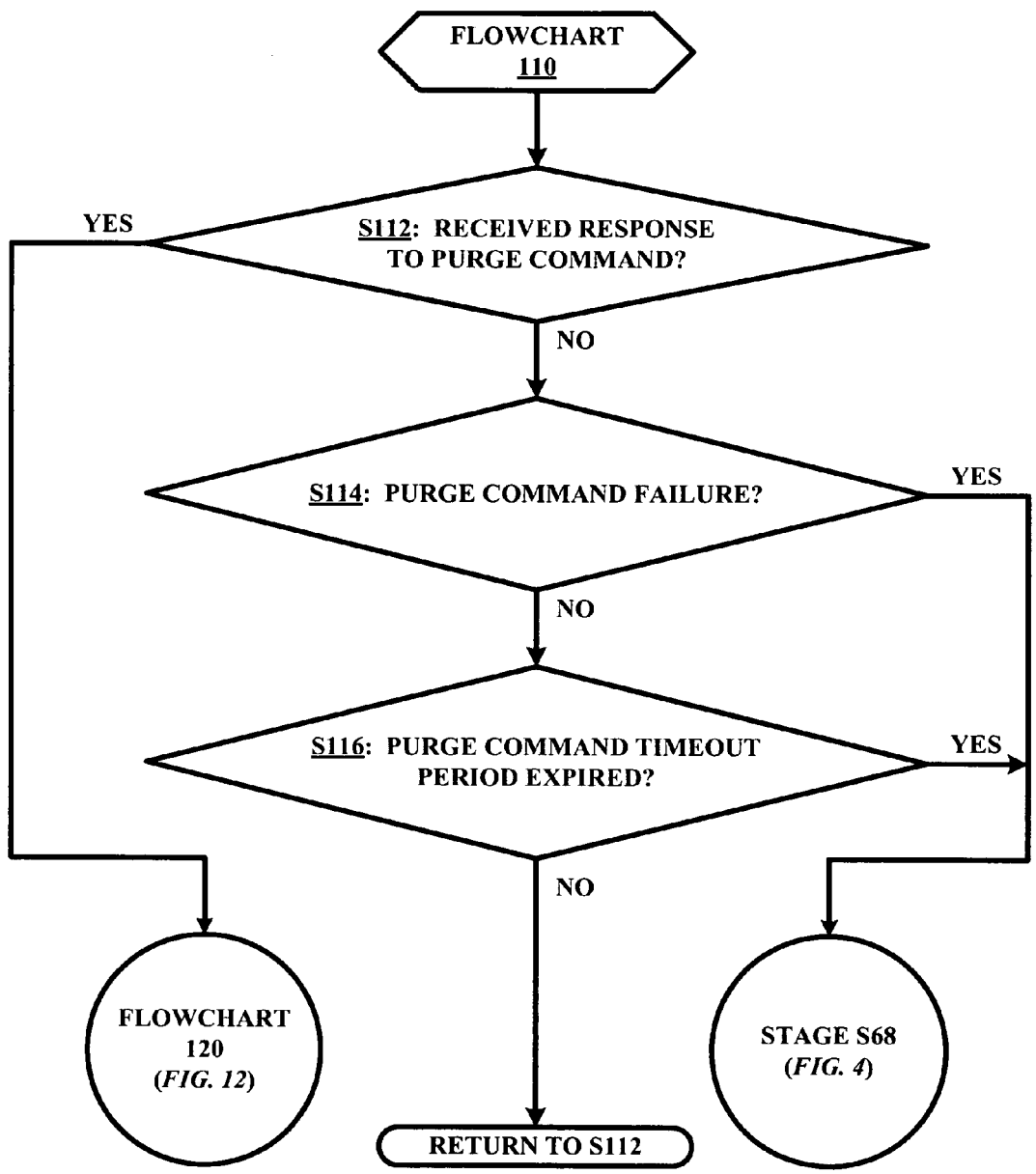
FIG. 11 illustrates a flowchart representative of one embodiment of a purge command processing method in accordance with the present invention.
Figure 12:
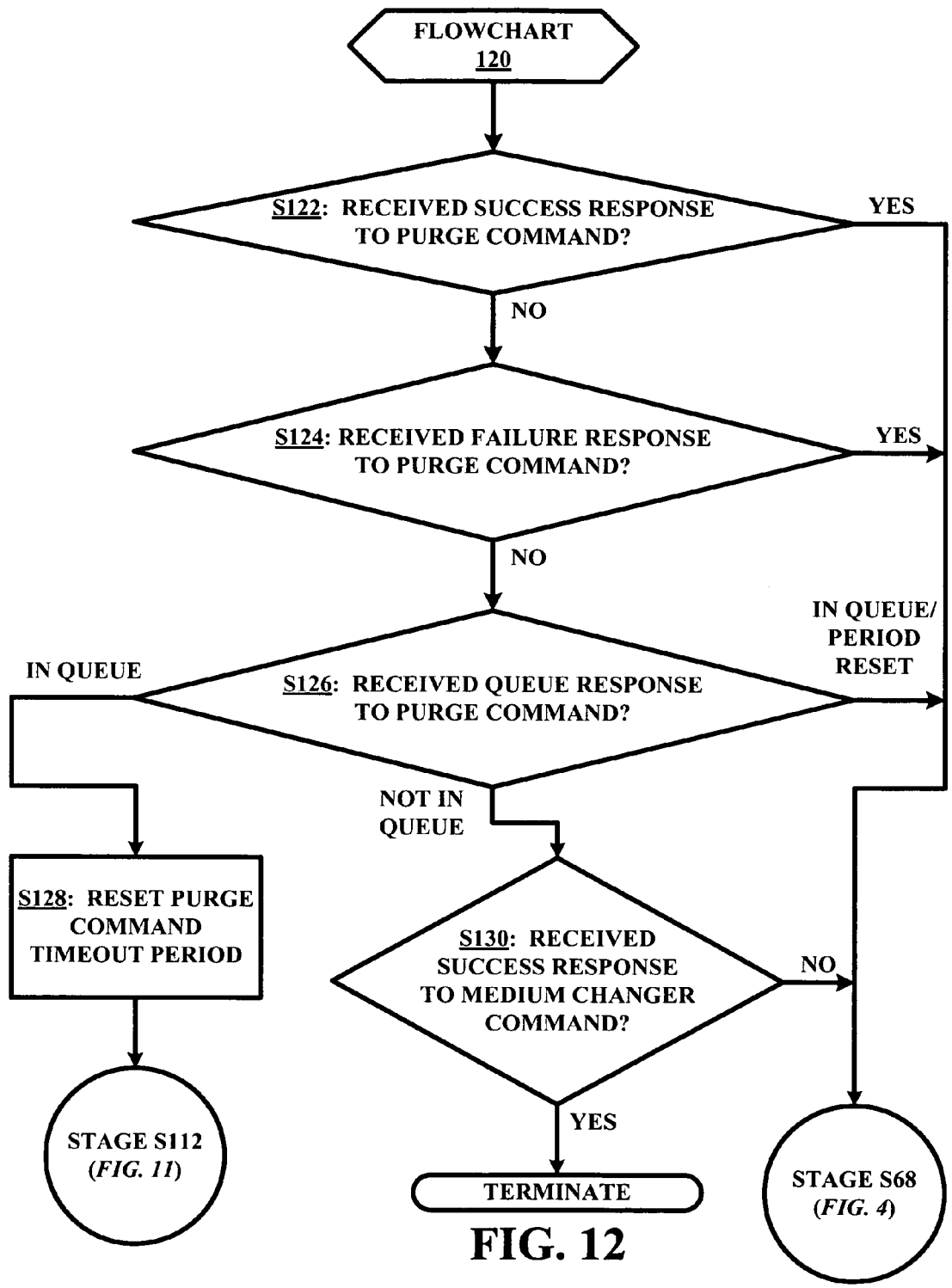
FIG. 12 illustrates a flowchart representative of one embodiment of a purge response processing method in accordance with the present invention.

If triggered to issue a purge command, then host library controller 30 initiates a flowchart 110 representative of a purge command processing method of the present invention as illustrated in FIG. 11. A stage S112 of flowchart 110 encompasses host library controller 30 determining whether the selected best port 31 has received an ICU response to the purge command. If so, then host library controller 30 proceeds to initiate a flowchart 120 (FIG. 12) as will be subsequently described herein. Otherwise, host library controller 30 proceeds to a stage S114 of flowchart 100 to determine whether the purge command has failed due to an operational problem with the selected best port 31 (e.g., the selected best port 31 has become unavailable after the issuance of the purge command and prior to receiving any ICU response). If so, then host library controller 30 proceeds to stage S68 of flowchart 60 (FIG. 4) to conditionally select a next best port as will be subsequently described herein. Otherwise, host library controller 30 proceeds to a stage S116 of flowchart 100 to determine whether the purge command timeout period has expired. If so, then host library controller 30 proceeds to stage S68 of flowchart 60 to conditionally select a next best port as will be subsequently described herein. Otherwise, host library controller 30 returns to stage S112 whereby stages S112-S116 are repeated until host library controller 30 is either triggered to initiate flowchart 120 (FIG. 12) or triggered to proceed to conditional next best port selection stage S68 (FIG. 4).

If triggered to issue initiate flowchart 120, then host library controller 30 proceeds to a stage S122 of flowchart 120 to determine whether an ICU success response to the issued purge command was received where the response indicates the issued medium changer command was purged from the queue 41 associated with the selected best port 31. If so, then host library controller 30 proceeds to stage S68 of flowchart 60 to conditionally select a next best port as will be subsequently described herein. Otherwise, host library controller 30 proceeds to a stage S124 of flowchart 120 to determine whether an ICU failure response to the issued purge command was received where the response indicates the issued medium changer command was not purged from the queue 41 associated with the selected best port 31 under certain error circumstances. If so, then host library controller 30 proceeds to stage S68 of flowchart 60 to conditionally select a next best port as will be subsequently described herein.

Otherwise, host library controller 30 proceeds to a stage S126 of flowchart 120 to determine whether an ICU queue response to the issued purge command was received where the response indicates the issued medium changer command is or is not stored in the queue. If the issued medium changer command is stored in the queue and stage S126 is being executed for a first time, then host library controller 30 proceeds to stage S128 of flowchart 120 to reset the purge command timeout period with a predefined wait time (e.g., one minute) and returns to stage S112 (FIG. 11). If the issued medium changer command is stored in the queue and stage S126 is being executed for a second time, then host library controller 30 proceeds to stage S68 of flowchart 60 to conditionally selected a next best port as will be subsequently described herein.

If the issued medium changer command is not stored in the queue, then the host library controller proceeds to a stage S130 of flowchart 120 to determine whether an ICU success response to the issued medium changer command has been received. If so, then host library controller 30 terminates flowchart 120. Otherwise, host library controller 20 proceeds to stage S68 of flowchart 60 to conditionally select a next best port as will be subsequently described herein Referring to FIGS. 10-12, those having ordinary skill in the art will appreciate the numerous advantages of the various methods of the present invention represented by FIGS. 10-12 including, but not limited to, a progression of an educated decision as to whether it is necessary to selected a next best port for communicating an issued medium changer command to medium changer library 20.

Referring again to FIG. 4, if host library controller 30 has been triggered to proceed from stage S66 to stage S68 as previously described herein, then host library controller 30 determines whether all ports listed as being available have been previously selected as a best port/next best port or whether a maximum wait time has been exceeded (e.g., sixteen minutes). If so, then host library controller 30 terminates flowchart 60 to thereby initiate appropriate error recovery procedures as would be appreciated by those having ordinary skill in the art. Otherwise, host library controller 30 proceeds to a stage S70 of flowchart 60 to select an ith next best port for communicating the issued medium changer command to medium changer library 20 depending on the command processing statuses of the remaining listed ports 31. For example, assuming port 31(3) was previously selected as the best port, then host library controller 30 would select a next best port among listed ports 31(1), 31(2) and 31(4) depending on the command processing statuses of ports 31(1), 31(2) and 31(4).

In one embodiment of stage S70, host library controller 30 executes flowchart 80 (FIG. 5) as previously described herein in the context of the previously selected best port being removed from the available port listing. An execution of flowchart 80 during stage S70 for selecting the next best port will now be exemplary described herein to further facilitate an understanding of the present invention.

Figure 13:
FIGS. 13-19 illustrate exemplary executions of the flowcharts illustrated in FIGS. 4, 5, 10 and 11 in accordance with the present invention.
Figure 14:

As illustrated in FIG. 13, if a listing of ports 31(1), 31(2) and 31(4) reveals port 31(2) is the single port among ports 31(1), 31(2) and 31(4) having zero (0) queued medium changer commands as indicated by the command processing statuses of ports 31(1), 31(2) and 31(4), then host library controller 30 would select port 31(2) as the $1^{st}$ next best port and remove the selected port 31(2) from the available port listing. Otherwise, as illustrated in FIG. 14, if a listing of ports 31(1), 31(2) and 31(4) reveals port 31(2) is the single port among ports 31(1), 31(2) and 31(4) having zero (0) queued medium changer move commands as indicated by the command processing statuses of ports 31(1), 31(2) and 31(4), then host library controller 30 would select port 31(2) as the $1^{st}$ next best port and remove the selected port 31(2) from the available port listing.

Figure 15:
Figure 16:

Otherwise, as illustrated in FIG. 15, if a listing of ports 31(1), 31(2) and 31(4) reveals port 31(2) is the single port among ports 31(1), 31(2) and 31(4) having less than three (3) queued medium changer move commands as indicated by the command processing statuses of ports 31(1), 31(2) and 31(4), then host library controller 30 would select port 31(2) as the $1^{st}$ next best port and remove the selected port 31(2) from the available port listing. Otherwise, as illustrated in FIG. 16, if a listing of ports 31(1), 31(2) and 31(4) reveals all of the ports 31(1), 31(2) and 31(4) have three (3) or more queued medium changer move commands as indicated by the command processing statuses of ports 31(1), 31(2) and 31(4), then host library controller 30 would select the next best port in a systematic manner and remove the selected port from the available port listing. In this example, port 31(2) among ports 31(1), 31(2) and 31(4) is being pointed to by a global index and therefore would be selected by host library controller 30 as the $1^{st}$ next best port for communicating the issued medium changer command to medium changer library 20.

Upon completion of stage S70, host library controller 30 proceeds to stage S66 for a second time to determine whether to select a second next best port for communicating the issued medium changer command to medium changer command library 20. Again, in one embodiment, host library controller 30 can execute flowchart 100 (FIG. 10), flowchart 110 (FIG. 11) and flowchart 120 (FIG. 12) as needed during stage S66. To further facilitate an understanding of the present invention, an execution of flowchart 80 during stage S70 for selecting the second next best port will now be exemplary described herein in the context of host library controller 30 being triggered during stage S66 and S68 to select a second next best port for communicating the issued medium changer command to medium changer command library 20.

Figure 17:
Figure 18:
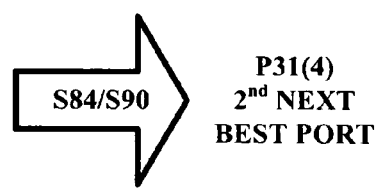

As illustrated in FIG. 17, if a listing of ports 31(1) and 31(4) reveals port 31(4) is the single port among ports 31(1) and 31(4) having zero (0) queued medium changer commands as indicated by the command processing statuses of ports 31(1) and 31(4), then host library controller 30 would select port 31(4) as the $2^{nd}$ next best port and remove the selected port 31(4) from the available port listing. Otherwise, as illustrated in FIG. 18, if a listing of ports 31(1) and 31(4) reveals port 31(4) is the single port among ports 31(1) and 31(4) having zero (0) queued medium changer move commands as indicated by the command processing statuses of ports 31(1) and 31(4), then host library controller 30 would select port 31(4) as the $2^{nd}$ next best port and remove the selected port 31(4) from the available port listing.

Figure 19:

Otherwise, as illustrated in FIG. 19, if a listing of ports 31(1) and 31(4) reveals port 31(4) is the single port among ports 31(1) and 31(4) having less than three (3) queued medium changer move commands as indicated by the command processing statuses of ports 31(1) and 31(4), then host library controller 30 would select port 31(4) as the 2nd next best port and remove the selected port 31(2) from the available port listing. Otherwise, if a listing of ports 31(1) and 31(4) reveals all ports as having three (3) or more queued medium changer move commands as indicated by the command processing statuses of ports 31(1) and 31(4), then host library controller 30 would select the next best port in a systematic manner and remove the selected port from the available port listing. In this example, port 31(4) among ports 31(1) and 31(4) is being pointed to by a global index and therefore would be selected by host library controller 30 as the 2nd next best port for communicating the issued medium changer command to medium changer library 20.

Referring to FIGS. 3-19, those having ordinary skill in the art will appreciate the numerous advantages of the present invention including, but not limited to, a comprehensive technique for facilitating an educated selection of one or more ports for communicating an issued medium changer command to medium changer library 20.

Referring to FIG. 2, processor 32 can include one central processing unit, or a plurality of central processing units installed on a single computer or distributed over a plurality of computers. Furthermore, memory 33 can include a single instruction storage unit of any type or a plurality of instruction storage units installed on a single computer or distributed over a plurality of computers. Additionally, the instructions stored in memory 33 and embodying the present invention as taught herein can be written in any programming language as would be appreciated by those having ordinary skill in the art.

Those having ordinary skill in the art of medium changer libraries may develop other embodiments of the invention in view of the inventive principles of the present invention described herein. The terms and expression which have been employed in the foregoing specification are used herein as terms of description and not of limitations, and there is no intention in the use of such terms and expressions of excluding equivalents of the features shown and described or portions thereof, it being recognized that the scope of the invention is defined and limited only by the claims which follow.

We claim:

1. A host library controller, comprising:
    a plurality of ports to establish a plurality of communication paths from the host library controller to a medium changer library;
    a processor; and
    a memory storing instructions operable within the processor, the instructions being executed to perform operations, the operations comprising:
        issuing a selected medium changer command from a medium changer command set, wherein the medium changer command set has medium changer non-move commands and medium changer move commands;
        selecting at least one port of the plurality of ports to communicate the issued selected medium changer command to the medium changer library depending on a command processing status of each port by:
            (a) determining that (i) no single port with zero queued medium changer non-move command exists; (ii) no single port with zero queued medium changer move command exists; and (iii) no single port with less than a specified number of queued medium changer move command exists; and
            (b) in response to the determining, selecting the at least one port of the plurality of ports to communicate the issued selected medium changer command to the medium changer library, wherein the selected at least one port has more than or equal to the specified number of queued medium changer move commands listed in an associated command queue of the selected at least one port; and
        increasing a command timeout period associated with a communication of the issued selected medium changer command from the host library controller to the medium changer library, in response to the selecting of the at least one port.

2. The host library controller of claim 1, wherein the selecting of the at least one port of the plurality of ports to communicate the issued selected medium changer command to the medium changer library includes: selecting a first port of the plurality of ports to communicate the issued selected medium changer command to the medium changer library depending on the first port being a single port among the plurality of ports without any medium changer commands listed in an associated command queue.

3. The host library controller of claim 1, wherein the selecting of the at least one port of the plurality of ports to communicate the issued selected medium changer command to the medium changer library includes: selecting a first port of the plurality of ports to communicate the issued selected medium changer command to the medium changer library depending on the first port being a single port among the plurality of ports without any medium changer move commands listed in an associated command queue.

4. The host library controller of claim 1, wherein the selecting of the at least one port of the plurality of ports to communicate the issued selected medium changer command to the medium changer library includes: selecting a first port of the plurality of ports to communicate the issued selected medium changer command to the medium changer library depending on the first port being a single port among the plurality of ports with less than a specified number of medium changer move commands listed in an associated command queue.

5. The host library controller of claim 1, wherein the selecting of the at least one port of the plurality of ports to communicate the issued selected medium changer command to the medium changer library farther includes: selecting a first port of the plurality of ports to communicate the issued selected medium changer command to the medium changer library depending on a command processing status of the first port among the plurality of ports; and conditionally selecting a second port of the plurality of ports to communicate the issued selected medium changer command to the medium changer library depending on receiving a failure response corresponding to a use of the first port to communicate the issued selected medium changer command from the host library controller to the medium changer library.

6. The host library controller of claim 1, wherein the selecting of the at least one port of the plurality of ports to communicate the issued selected medium changer command to the medium changer library farther includes: selecting a first port of the plurality of ports to communicate the issued selected medium changer command to the medium changer library depending on a command processing status of the first port among the plurality of ports; and conditionally selecting a second port of the plurality of ports to communicate the issued selected medium changer command to the medium changer library depending on the first port being unavailable to communicate the issued selected medium changer command to the medium changer library.

7. The host library controller of claim 1, wherein the selecting of the at least one port of the plurality of ports to communicate the issued selected medium changer command to the medium changer library further includes: selecting a first port of the plurality of ports to communicate the issued selected medium changer command to the medium changer library depending on a command processing status of the first port among the plurality of ports; and conditionally selecting a second port of the plurality of ports to communicate the issued selected medium changer command to the medium changer library depending on an expiration of a command timeout corresponding to a use of the first port to communicate the issued selected medium changer command from the host library controller to the medium changer library.

8. The host library controller of claim 1, wherein the instructions are further executed to issue a purge command to purge the issued selected medium changer command from the command queue associated with the first port depending on a requirement to select a second port to communicate the issued selected medium changer command to the medium changer library.

9. A library system, comprising:
a medium changer library; and
a host library controller including a plurality of ports to establish a plurality of communication paths from the host library controller to the medium changer library, wherein the host library controller is operable to issue a selected medium changer command from a medium changer command set, wherein the medium changer command set has medium changer non-move commands and medium changer move commands; and
wherein the host library controller is operable to select at least one port of the plurality of ports to communicate the issued selected medium changer command to the medium changer library depending on a command processing status of each port by:
(a) determining that (i) no single port with zero queued medium changer non-move command exists; (ii) no single port with zero queued medium changer move command exists; and (iii) no single port with less than a specified number of queued medium changer move command exists; and
(b) in response to the determining, selecting the at least one port of the plurality of ports to communicate the issued selected medium changer command to the medium changer library, wherein the selected at least one port has more than or equal to the specified number of queued medium changer move commands listed in an associated command queue of the selected at least one port; and
wherein the host library controller is operable to increase a command timeout period associated with a communication of the issued selected medium changer command from the host library controller, in response to the selecting of the at least one port.

10. The library system of claim 9, wherein the selecting of the at least one port of the plurality of ports to communicate the issued selected medium changer command to the medium changer library includes: selecting a first port of the plurality of ports to communicate the issued selected medium changer command to the medium changer library depending on the first port being a single port among the plurality of ports without any medium changer commands listed in an associated command queue.

11. The library system of claim 9 wherein the selecting of the at least one port of the plurality of ports to communicate the issued selected medium changer command to the medium changer library includes: selecting a first port of the plurality of ports to communicate the issued selected medium changer command to the medium changer library depending on the first port being a single port among the plurality of ports without any medium changer move commands listed in an associated command queue.

12. The library system of claim 9, wherein the selecting of the at least one port of the plurality of ports to communicate the issued selected medium changer command to the medium changer library includes: selecting a first port of the plurality of ports to communicate the issued selected medium changer command to the medium changer library depending on the first port being a single port among the plurality of ports with less than a specified number of medium changer move commands listed in an associated command queue.

13. A method, comprising:
providing a host library controller;
providing a plurality of ports to establish a plurality of communication paths from the host library controller to a medium changer library;
issuing a selected medium changer command from a medium changer command set, wherein the medium changer command set has medium changer non-move commands and medium changer move commands; and
selecting at least one port of the plurality of ports to communicate the issued selected medium changer command to the medium changer library depending on a command processing status of each port by:
(a) determining that (i) no single port with zero queued non-move medium changer command exists; (ii) no single port with zero queued medium changer move command exists; and (iii) no single port with less than a specified number of queued medium change move command exists; and
(b) in response to the determining, selecting the at least one port of the plurality of ports to communicate the issued selected medium changer command to the medium changer library, wherein the selected at least one port has more than or equal to the specified number of queued medium changer move commands listed in an associated command queue of the selected at least one port; and
increasing a command timeout period associated with a communication of the issued selected medium changer command from the host library controller, in response to the selecting of the at least one port.

14. The method of claim 13, wherein a purge command timeout period is reset with a predefined wait time.

15. The host library controller of claim 1, wherein a purge command timeout period is reset with a predefined wait time.

16. The library system of claim 9, wherein a purge command timeout period is reset with a predefined wait time.

17. A computer readable storage medium storing a program of machine-readable instructions executable by a processor to perform operations utilizing a plurality of ports establishing a plurality of communication paths from a host library controller to a medium change library, the operations comprising:
issuing a selected medium changer command from a medium changer command set, wherein the medium changer command set has medium changer non-move commands and medium changer move commands;

selecting at least one port of the plurality of ports to communicate the issued selected medium changer command to the medium changer library depending on a command processing status of each port by:

(a) determining that (i) no single port with zero queued medium changer non-move command exists; (ii) no single port with zero queued medium changer move command exists; and (iii) no single port with less than a specified number of queued medium change move command exists; and (b) in response to the determining, selecting the at least one port of the plurality of ports to communicate the issued selected medium changer command to the medium changer library, wherein the selected at least one port has more than or equal to the specified number of queued medium changer move commands listed in an associated command queue of the selected at least one port; and increasing a command timeout period associated with a communication of the issued selected medium changer command from the host library controller, in response to the selecting of the at least one port.

18. The computer readable storage medium of claim 17, wherein a purge command timeout period is reset with a predefined wait time.

\* \* \* \* \*